(12) United States Patent
Pearlman et al.

(10) Patent No.: US 11,595,727 B2
(45) Date of Patent: *Feb. 28, 2023

(54) SYSTEMS AND METHODS FOR LOADING INTERACTIVE MEDIA GUIDE DATA BASED ON USER HISTORY

(71) Applicant: Rovi Guides, Inc., San Jose, CA (US)

(72) Inventors: Craig Pearlman, Chalfont, PA (US); Camron Shimy, Canyon Country, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,926

(22) Filed: Aug. 17, 2020

(65) Prior Publication Data

US 2021/0029411 A1 Jan. 28, 2021

Related U.S. Application Data

(63) Continuation of application No. 15/670,949, filed on Aug. 7, 2017, now Pat. No. 10,785,542, which is a
(Continued)

(51) Int. Cl.
*H04N 5/445* (2011.01)
*H04N 21/482* (2011.01)
(Continued)

(52) U.S. Cl.
CPC ....... *H04N 21/4826* (2013.01); *H04N 21/431* (2013.01); *H04N 21/4334* (2013.01);
(Continued)

(58) Field of Classification Search
CPC .......... H04N 21/4826; H04N 21/4334; H04N 21/44222; H04N 21/4755; H04N 21/482; H04N 21/4821; H04N 21/812; H04N 21/431; H04N 21/8405; H04N 21/4532; H04N 21/4667; H04N 21/4668; H04N 21/4828; H04N 21/6125; H04N 21/4312; H04N 21/4147; H04N 21/4622;
(Continued)

(56) References Cited

U.S. PATENT DOCUMENTS 6,005,603 A 12/1999 Flavin
6,104,334 A 8/2000 Allport
(Continued)

FOREIGN PATENT DOCUMENTS

WO 9966394 A1 12/1999

OTHER PUBLICATIONS

U.S. Appl. No. 17/563,796, filed Dec. 28, 2021, Craig Pearlman.

*Primary Examiner* — Annan Q Shang
(74) *Attorney, Agent, or Firm* — Haley Guiliano LLP

(57) ABSTRACT

Systems and methods for efficiently loading interactive media guide data based on user history are provided. A plurality of asset descriptions associated with a first media asset is received. A second media asset related to the first media asset is identified. An asset description is selected form the plurality of asset descriptions based on user history of accessing the second media asset. Data for the first media asset is loaded. Data for the first media asset comprises the selected asset description.

20 Claims, 10 Drawing Sheets

Related U.S. Application Data continuation of application No. 14/319,007, filed on Jun. 30, 2014, now Pat. No. 9,729,933.

(51) Int. Cl.
| | |
|---|---|
| *H04N 21/431* | (2011.01) |
| *H04N 21/8405* | (2011.01) |
| *H04N 21/45* | (2011.01) |
| *H04N 21/466* | (2011.01) |
| *H04N 21/433* | (2011.01) |
| *H04N 21/475* | (2011.01) |
| *H04N 21/81* | (2011.01) |
| *H04N 21/442* | (2011.01) |

(52) U.S. Cl.
CPC . *H04N 21/44222* (2013.01); *H04N 21/44226* (2020.08); *H04N 21/4532* (2013.01); *H04N 21/4667* (2013.01); *H04N 21/4668* (2013.01); *H04N 21/4755* (2013.01); *H04N 21/482* (2013.01); *H04N 21/4821* (2013.01); *H04N 21/4828* (2013.01); *H04N 21/812* (2013.01); *H04N 21/8405* (2013.01)

(58) Field of Classification Search
CPC ......... H04N 21/4782; H04N 21/42219; H04N 21/47202; H04N 21/47205; H04N 21/47217; H04N 21/6175; H04N 21/8173; H04N 21/8586; H04N 21/8166; H04N 21/2368
See application file for complete search history.

(56) References Cited

U.S. PATENT DOCUMENTS

| | | | |
|---|---|---|---|
| 6,163,316 A | 12/2000 | Killian | |
| 6,208,805 B1 | 3/2001 | Abecassis | |
| 6,239,794 B1 | 5/2001 | Yuen et al. | |
| 6,349,791 B1 | 2/2002 | Glenning et al. | |
| 6,388,714 B1 | 5/2002 | Schein et al. | |
| 6,564,378 B1 | 5/2003 | Satterfield et al. | |
| 6,756,997 B1 | 6/2004 | Ward et al. | |
| 7,073,187 B1 | 7/2006 | Hendricks et al. | |
| 7,165,098 B1 | 1/2007 | Boyer et al. | |
| 7,533,399 B2* | 5/2009 | Ma | H04N 21/41407 |
| | | | 725/46 |
| 7,624,416 B1* | 11/2009 | Vandermolen | H04N 21/26603 |
| | | | 725/115 |
| 7,644,427 B1* | 1/2010 | Horvitz | H04N 21/4662 |
| | | | 725/9 |
| 7,681,128 B2 | 3/2010 | Yamamoto et al. | |
| 7,761,892 B2 | 7/2010 | Ellis et al. | |
| 7,882,260 B2 | 2/2011 | Taylor et al. | |
| 8,046,801 B2 | 10/2011 | Ellis et al. | |
| 8,365,222 B2 | 1/2013 | Baldwin et al. | |
| 8,384,743 B2 | 2/2013 | Gorti et al. | |
| 8,555,318 B2 | 10/2013 | Whitehead | |
| 8,799,944 B2 | 8/2014 | Angiolillo et al. | |
| 8,881,209 B2 | 11/2014 | Kalmes et al. | |
| 8,924,465 B1 | 12/2014 | Tunguz-Zawislak | |
| 9,596,518 B2 | 3/2017 | Foote et al. | |
| 9,639,634 B1 | 5/2017 | Greene et al. | |
| 10,361,802 B1 | 7/2019 | Hoffberg-Borghesani et al. | |
| 2002/0147782 A1 | 10/2002 | Dimitrova et al. | |
| 2002/0166119 A1 | 11/2002 | Cristofalo | |
| 2002/0174430 A1 | 11/2002 | Ellis et al. | |
| 2003/0061610 A1* | 3/2003 | Errico | H04N 21/4334 |
| 2003/0110499 A1 | 6/2003 | Knudson et al. | |
| 2004/0021793 A1* | 2/2004 | Takatori | H04N 21/258 |
| | | | 348/E7.071 |
| 2004/0073918 A1 | 4/2004 | Ferman et al. | |
| 2004/0139482 A1 | 7/2004 | Hale et al. | |
| 2005/0251827 A1 | 11/2005 | Ellis et al. | |
| 2006/0123448 A1 | 6/2006 | Ma et al. | |
| 2006/0206912 A1* | 9/2006 | Klarfeld | H04N 21/4823 |
| | | | 725/39 |
| 2006/0282856 A1* | 12/2006 | Errico | G06Q 30/02 |
| | | | 725/46 |
| 2007/0186243 A1 | 8/2007 | Pettit et al. | |
| 2007/0271404 A1 | 11/2007 | Dearth et al. | |
| 2008/0059535 A1 | 3/2008 | Lindsley et al. | |
| 2008/0065991 A1 | 3/2008 | Grimes et al. | |
| 2009/0183210 A1 | 7/2009 | Andrade | |
| 2009/0259955 A1 | 10/2009 | Barsook et al. | |
| 2009/0282436 A1 | 11/2009 | Perry | |
| 2010/0070448 A1* | 3/2010 | Omoigui | H01L 27/1463 |
| | | | 706/47 |
| 2010/0070454 A1* | 3/2010 | Masuda | H04N 21/25891 |
| | | | 707/E17.014 |
| 2010/0094896 A1* | 4/2010 | Ozawa | H04N 5/782 |
| | | | 715/764 |
| 2010/0153885 A1 | 6/2010 | Yates | |
| 2010/0153989 A1 | 6/2010 | Jing et al. | |
| 2010/0211439 A1 | 8/2010 | Marci et al. | |
| 2010/0242065 A1* | 9/2010 | Murakami | G06Q 10/00 |
| | | | 725/34 |
| 2011/0125793 A1 | 5/2011 | Erhart et al. | |
| 2011/0145064 A1 | 6/2011 | Anderson et al. | |
| 2011/0276993 A1* | 11/2011 | Ferguson | H04N 21/2665 |
| | | | 725/30 |
| 2011/0282943 A1 | 11/2011 | Anderson et al. | |
| 2012/0131615 A1 | 5/2012 | Kobayashi et al. | |
| 2012/0221656 A1 | 8/2012 | Cai et al. | |
| 2012/0278725 A1 | 11/2012 | Gordon et al. | |
| 2012/0324493 A1 | 12/2012 | Holmdahl et al. | |
| 2013/0254308 A1 | 9/2013 | Rose et al. | |
| 2013/0263168 A1 | 10/2013 | Choi | |
| 2013/0304822 A1 | 11/2013 | Tetreault | |
| 2014/0020024 A1 | 1/2014 | Asam et al. | |
| 2014/0053196 A1 | 2/2014 | Selim | |
| 2014/0081914 A1 | 3/2014 | Smith et al. | |
| 2014/0223464 A1 | 8/2014 | Moran et al. | |
| 2014/0223480 A1 | 8/2014 | Berry et al. | |
| 2014/0245358 A1 | 8/2014 | Kumar et al. | |
| 2015/0014461 A1 | 1/2015 | Hoffman et al. | |
| 2015/0016661 A1 | 1/2015 | Lord | |
| 2015/0026119 A1 | 1/2015 | Fischer et al. | |
| 2015/0100987 A1 | 4/2015 | Whitman et al. | |
| 2015/0128102 A1* | 5/2015 | Perry | G06F 30/20 |
| | | | 716/137 |
| 2015/0139610 A1 | 5/2015 | Syed et al. | |
| 2015/0188720 A1 | 7/2015 | Winter | |
| 2015/0194146 A1 | 7/2015 | Wu et al. | |
| 2015/0227579 A1 | 8/2015 | Cantarero et al. | |
| 2015/0249873 A1 | 9/2015 | Sprague | |
| 2015/0382047 A1 | 12/2015 | Van Os et al. | |
| 2016/0227134 A1 | 8/2016 | Voss | |
| 2016/0253710 A1 | 9/2016 | Publicover et al. | |
| 2019/0173939 A1 | 6/2019 | Lewis et al. | |
| 2022/0124412 A1 | 4/2022 | Pearlman et al. | |

\* cited by examiner

FIG. 5

SYSTEMS AND METHODS FOR LOADING INTERACTIVE MEDIA GUIDE DATA BASED ON USER HISTORY

CROSS REFERENCE TO RELATED APPLICATION

This application is a continuation of U.S. patent application Ser. No. 15/670,949, filed Aug. 7, 2018, which is a continuation of U.S. patent application Ser. No. 14/319,007, filed Jun. 30, 2014, now U.S. Pat. No. 9,729,933, which are hereby incorporated by reference herein in their entireties.

BACKGROUND

Traditional systems load media guidance data and generate user interface elements for media assets based on fixed rules. For example, cover art, title and a brief description may be loaded and generated for display for all user interface elements in a media guidance display screen, including those user interface elements that are associated with media assets the user has accessed in the past. Thus, traditional systems fail to maximize available bandwidth for transmission of media asset descriptions, present only relevant functionality and efficiently generate a media guidance display screen.

SUMMARY

In view of the foregoing, systems and methods for loading interactive media guide data based on user history in accordance with various embodiments of the present disclosure are provided.

In some embodiments, a plurality of asset descriptions associated with a first media asset is received and a second media asset related to the first media asset is identified. An asset description is selected from the plurality of asset descriptions based on user history of accessing the second media asset. Data for the first media asset is loaded, with the data for the first media asset comprising the selected asset description.

In some embodiments, the asset description may include one or more descriptive elements. A descriptive element may include cover art, title, year, genre, episode number, series number, director, producer, creator, writer, member of the cast, album art, review, rating, price, summary, synopsis, critique, a portion of the media asset such as a preview or an image or a frame of the media asset, a portion of an audio included in the media asset, or any combination thereof, including a combination that does not include the title of the media asset.

In some embodiments, the asset description may include a file or a data structure that identifies a descriptive element of the asset description. The asset description may include a parameter associated with a display property of the descriptive element (e.g., its size, color, relative or absolute position, brightness, opaqueness, etc.).

In some embodiments, each asset description in the plurality of asset descriptions may provide a different amount of information about the first media asset. For example, a first asset description may include only cover art of the first media asset; a second asset description may include both cover art and a brief text description; a third asset description may include title information only or a brief text description only. an asset description for a particular media asset from storage 308 based on the user's history of accessing that particular media asset or a related media asset in the past.

In some embodiments, an asset description for the first media asset may be selected based on the user's preferences, user's history of accessing a related media asset in the past, or both. For example, an asset description for the first media asset may be selected based on the number of times the user has previously accessed the related media asset or a frequency with which the user accesses the related media asset. A different asset description may be associated with a different number of times the user has accessed a related media asset, e.g., so that the media guidance application may adapt to user's behavior over time and generate progressively simpler and more intuitive media guidance display screens.

In some embodiments, the media guidance display screen includes a user interface element associated with the first media asset (or with a product). A single description of the first media asset or product having multiple pieces of information is received. Prior to generating the user interface element, the single description may be parsed so that to select particular pieces of information or portions of these pieces of information to be included in the user interface element. For example, a full text description may be parsed to select particular portions of the full text description in order to create a summary.

In some implementations, a user interface element of the first media asset (or a product) may be generated or modified based on user's history of accessing a second media asset that is related to the first media asset. A candidate media asset may be designated as a related media asset based on characteristics stored in the user profile, a relationship between the first media asset and the candidate media assets, or both.

In some embodiments, the user interface element associated with the first media asset (or a product) includes one or more visual objects. Visual objects may be arranged in a particular order.

In some embodiments, visual objects to be included in the user interface element may be selected based on whether a second user has recommended a media asset (or a product) to the user of the media guidance application. The second user may be another user of the media guidance application or may be related to the first user, e.g., the second user may be identified as a friend or a relative in the user profile of the media guidance application or in the user profile of a third party provider.

In some embodiments, the user interface element may be generated based on the number of times another user has commented, expressed a liking or posted a message about a particular media asset or a product.

In some embodiments, the user interface element may be generated based on the number of user's friends who have commented, expressed a liking or posted a message about a particular media asset.

In some embodiments, display properties of user interface elements or visual objects included in user interface elements may be dynamically adjusted based on user's viewing history. Display properties of visual objects may include their size, font, font size, opaqueness or any other display property.

In some embodiments, the visual objects may be removed or rearranged from a first order to a second order specifying their position relative to each other.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5 shows an illustrative display screen of an interactive media guidance application in accordance with another embodiment of the disclosure;

DETAILED DESCRIPTION

Figure 1:
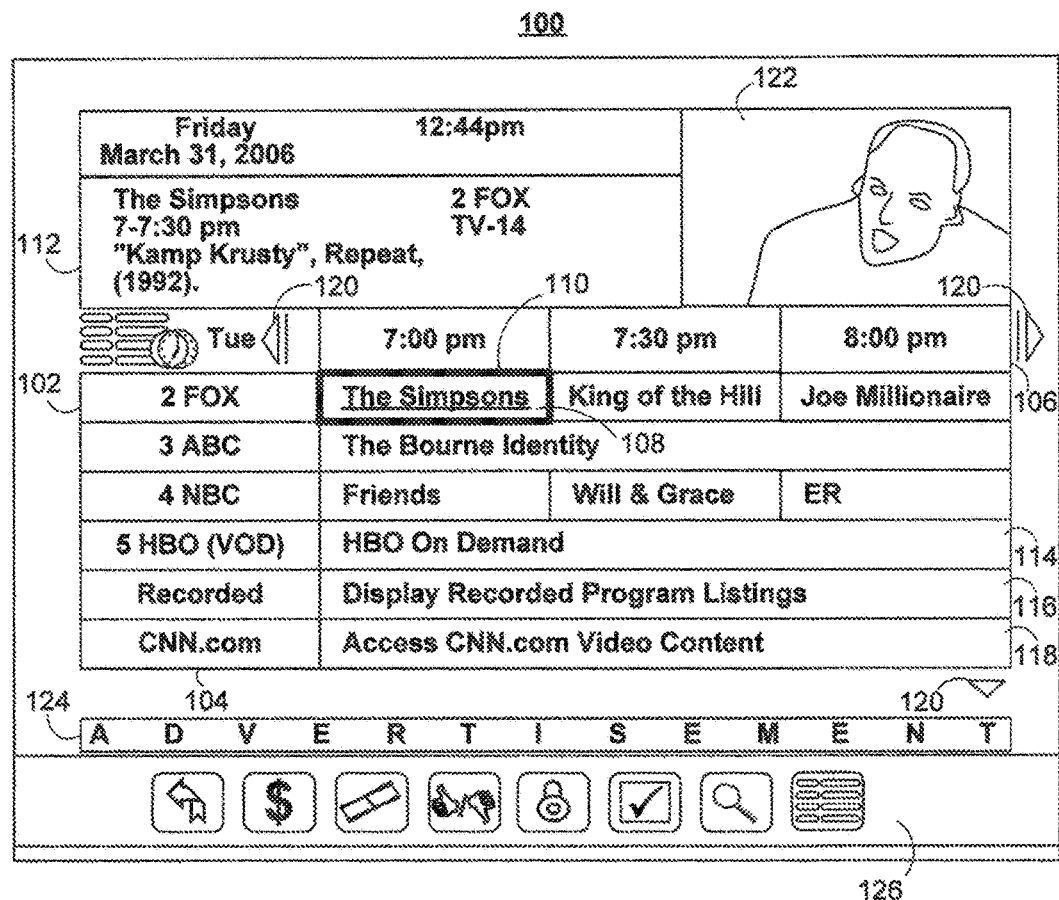
FIGS. 1 and 2 show illustrative display screens that may be used to provide media guidance application listings in accordance with an embodiment of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, multiple asset descriptions associated with any given media asset, user history of accessing a media asset, including the number of times a user has previously accessed the media asset and a frequency at which the user accesses the media asset, social media recommendations of the media asset, user guidance application settings, user preferences, user profile information, media listings, media-related information (e.g., broadcast times, broadcast channels, titles, box art, keywords corresponding to a description of a media asset, relatedness of a given media asset and another media asset, reviews and ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, relatedness of a given advertisement and another advertisement or a given advertisement and a media asset, etc.), on-demand information, blogs, websites, and any other type of guidance data that is helpful for a user to navigate among and locate desired content selections.

Figure 2:
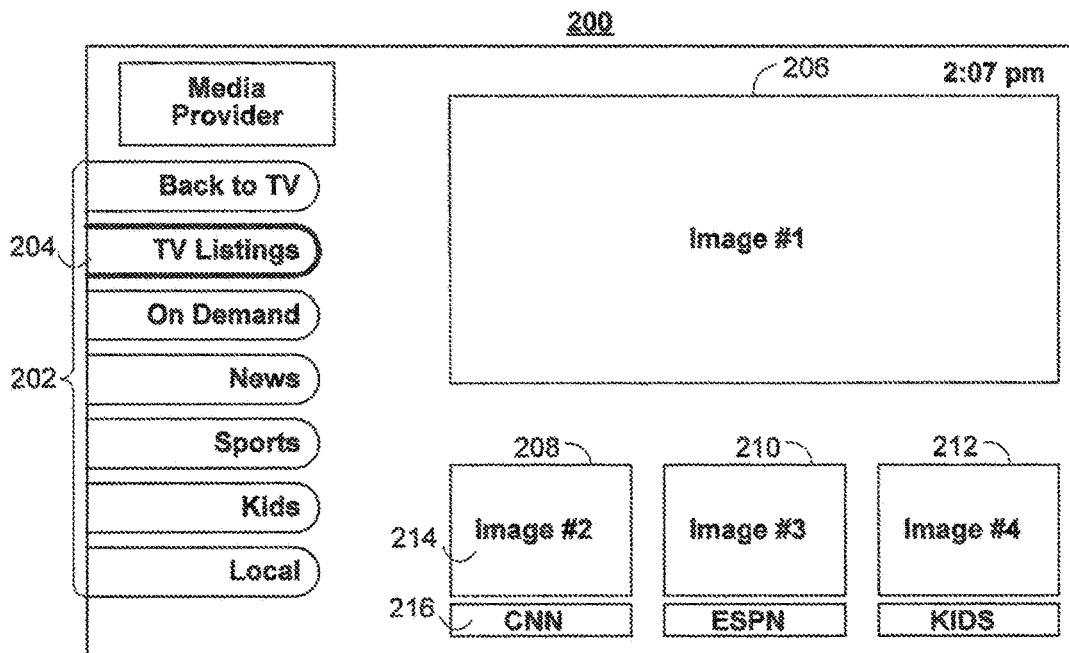

FIGS. 1-2 show illustrative display screens that may be used to provide media guidance data. The display screens shown in FIGS. 1-2 and 5-7 may be implemented on any suitable user equipment device or platform. While the displays of FIGS. 1-2 and 5-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

As referred to herein, the phrase "in response" should be understood to mean automatically, directly and immediately as a result of or automatically based on the corresponding action where intervening inputs or actions may occur.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. Instead of, or in addition to providing the title, each listing may provide a portion of the data associated with the media asset corresponding to the program listing. For example, the listing may include the cover art associated with the media asset, a text description of the media asset, a rating, a review by the user of the media guidance application, a review by another user or a critic. The cover art may depict one or more frames of the associated content or may correspond to (e.g., may be a frame of) a play position at which the user has previously paused the media asset. With a user input device, a user can select program listings by moving highlight region 110. Information or any other data relating to the program listing selected by highlight region 110 may be provided in program information region 112. Region 112 may include, for example, the program title, the program description, the time the program is provided (if applicable), the channel the program is on (if applicable), the program's rating, and other desired information. For example, the information in region 112 may identify a media asset that is related to the media asset associated with the selected program listing. In some embodiments, data included in program information region 112 may vary depending on user's history of accessing a program that is related to the program associated with the program listing 110. For example, the program associated with the program listing 110 may be an episode of "The Simpsons" and a related program may be "Futurama." If the user has never watched "Futurama," then the program information region 112 may include detailed information about "The Simpsons," e.g., information including cover art, title and a brief text description. However, if the user regularly watches "Futurama," then program information region 112 may include a short description, e.g., comprising only cover art and title for "The Simpsons." In some implementations, the program listing 110 itself may look different from other program listing in grid 102 and may be determined by user's history of accessing a program that is related to the program associated with the program listing 110. For example, the program listing 110 may have a different size, color, font, font size, font color, brightness, opaqueness, or any other visual display characteristic associated with program listings in grid 102.

As used herein, the terms "related media asset," "related asset" or "related program" should be understood to mean any media asset or program that has a relationship with another media asset. The relationship may be defined either automatically by monitoring the activity of the user (e.g., determining user selections of user interfaces, storing requests for media assets, search results, user history of accessing media assets, user recommendations of media assets to other users, etc.) or manually by the user (e.g. by storing user preferences or a user profile), or both. In some embodiments, attributes of two media assets (e.g., titles, genres, actors, reviews, ratings, keywords) may be compared to each other to determine whether one media asset is related to another. Comparison of the two media attributes may yield a numerical or alphanumerical relatedness value or weight that may be compared to a threshold (that may be set by the user). For example, a first media asset may be the movie "A nightmare on Elm Street" associated with a first keyword "gore" and a second media asset may be "Friday the 13th: The Final chapter" associated with a keyword "blood." Semantic algorithms, such as natural language algorithms, may be used to compare the two keywords and determine that the two media assets are related with a certain relatedness value characterizing the degree of relatedness. If the relatedness value exceeds a threshold set by the user, then the first and second media assets are designated as being related to each other. In some embodiments, the Internet or a website, such as IMDB or Rotten Tomatoes, may be contacted or searched to identify related media assets.

In certain implementations, instead of or in addition to comparing an attribute of a media asset with an attribute of another media asset, the attribute of the media asset may be compared to a characteristic or a preference stored in a user profile. The media asset may be classified as related or unrelated based on the comparison with the user's profile. For example, after determining that the movie "Ted" is potentially related to the TV series "Family Guy" (e.g., based on the fact that Seth MacFarlane was the creator of both), the genre of "Ted" may be compared to the genre preferences stored in the user profile. If the user has expressed a strong dislike in film comedies (of which "Ted" is an example), "Ted" may be designated as an unrelated media asset.

In some implementations, a first media asset may be designated as related to a second media asset based in part on how recently the user has accessed a second media asset.

Specifically, the time elapsed from the moment the user accessed the second media asset may be compared to a threshold (that may be set by the user). In some implementations, if it is determined that the elapsed time exceeds the threshold, the first media asset may be designated as unrelated to the second media asset or of no relevance to the user. For example, if more than a year has passed since the user has previously viewed an episode of "Family Guy," the TV show "American Dad" may be designated as unrelated to "Family Guy" or as of no relevance to the user even though both shows may be considered related otherwise (e.g., in view of both being sitcoms and created by the same person). Similarly, if the user has seen an episode of "Weeds" only two days ago, "Breaking Bad" may be designated as related to "Weeds."

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different from display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, based on whether the user has previously accessed a media asset related to the media asset associated with a program listing in grid 102, or on other suitable targeted advertisement bases. For example, advertisement 124 may include any of the recommendations discussed below in connection with FIGS. 5-7.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other airtimes or ways of receiving a program, recording a program, enabling series recording of a program, setting program and/or channel as a favorite, purchasing a program, identifying media assets that are related to a media asset associated with a program listing in grid 102, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. Program listing 206, 208, 210, and 212 may be related to each other. For example, program listings 208, 210, and 212 may be related to the program listing 206 based on the relationship between a media asset associated with the program listing 206 and a corresponding media asset associated with a program listing 208, 210, or 212. Program listings 208, 210 and 212 may also be related to the program listing 206 based on monitored user behavior or a user preference stored in a user profile. In display 200 the listings may provide graphical images including cover art, still images from the content, video clip previews, live video from the content, or other types of content that indicate to a user the content being described by the media guidance data in the listing. The graphical images presented in display 200 and their attributes may change over time based on user's history of accessing a given media asset. For example, graphical images 208, 210 and 212 may appear in a smaller size after the user has accessed a media asset associated with the program listing 206 a given number of times, or if the frequency at which the user accesses a media asset associated with the program listing 206 exceeds a given frequency threshold. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
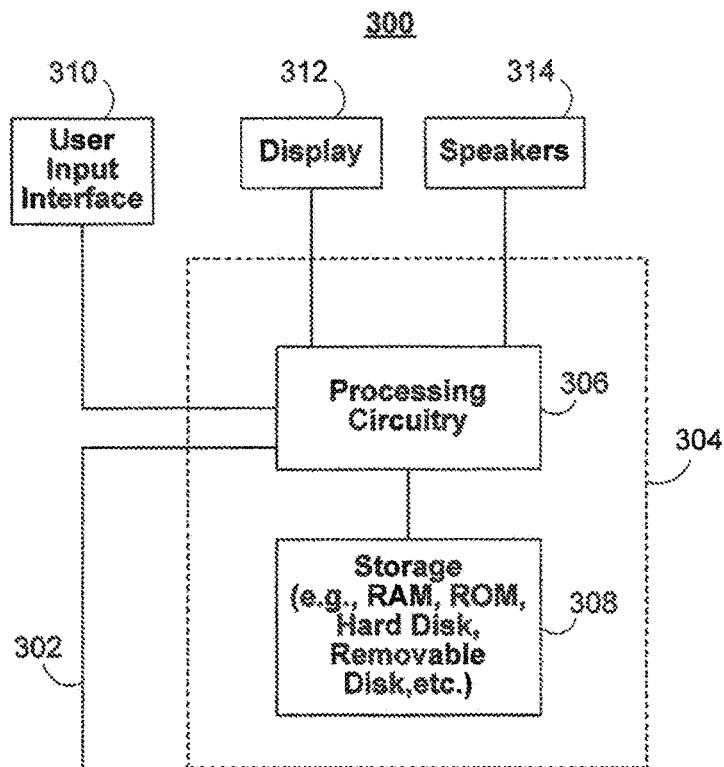
FIG. 3 shows an illustrative user equipment device in accordance with another embodiment of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

In some embodiments, a viewing history may be stored in storage 308 for a user. The viewing history may include indications of which media assets have been viewed by a given user. The viewing history may also include, for each media asset, the number of times the media asset has been accessed by a given user and the frequency at which a given user accesses the media asset. In some implementations, the viewing history may include indications of which users in a group of users have seen or viewed a media asset or a particular segment of a media asset. In some implementations, the viewing history may include indications of which media assets the user or a group of users have recommended to other users. The group of users may be users in a certain geographical location (e.g., in the same home) or users that are associated with each other on a social network.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above-mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

Control circuitry 304 may include asset identification circuitry. Asset identification circuitry may identify media assets that are related to a particular media asset. Asset identification circuitry may include a database of media attributes that associates one or more media attributes (e.g., title, actor, director, genre, rating, keywords) with a corresponding media asset. In some implementations, the database of media attributes may be stored at a remote server. To identify a media asset that is related to a given media asset, asset identification circuitry may select an attribute of the given media asset and transmit a query to the database of media attributes requesting information about a candidate media asset. The database of media attributes may determine the candidate media asset based on a comparison of the selected attribute and an attribute associated with the candidate media asset stored in the database of media attributes. For example, the database of media assets may be stored in storage 308 and may include a data structure associated with the selected attribute. The database of media attributes may retrieve the data structure to determine whether information about another (candidate) media asset (e.g., its title, identification number, or any other information identifying another media asset) is included in the data structure. In response to determining that information about the candidate media asset is included in the data structure, the database of media attributes may return that information to asset identification circuitry. When the database of media attributes determines that information about the candidate media asset is not included in the data structure, it may transmit a communication back to asset identification circuitry indicating that no candidate media asset was found.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
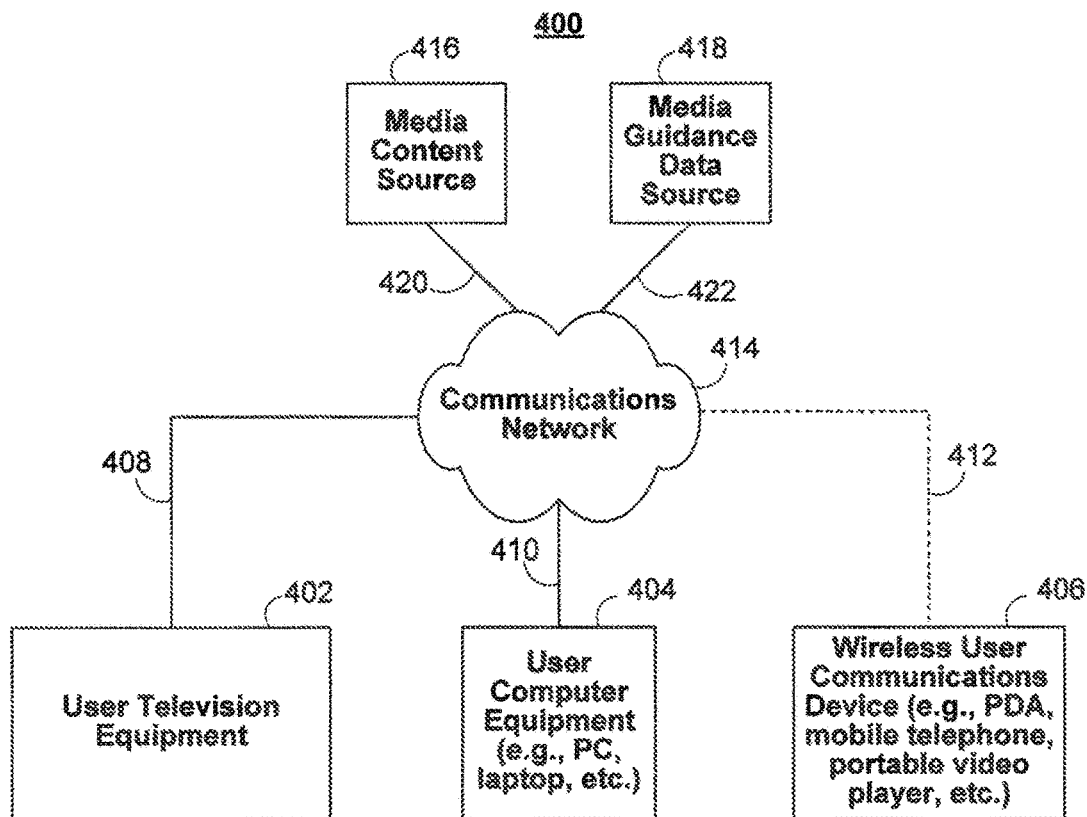
FIG. 4 is a diagram of an illustrative cross-platform interactive media system in accordance with another embodiment of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, in response to a user accessing a given media asset a certain number of times or at a certain frequency, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of a remote server. When executed by control circuitry of a remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
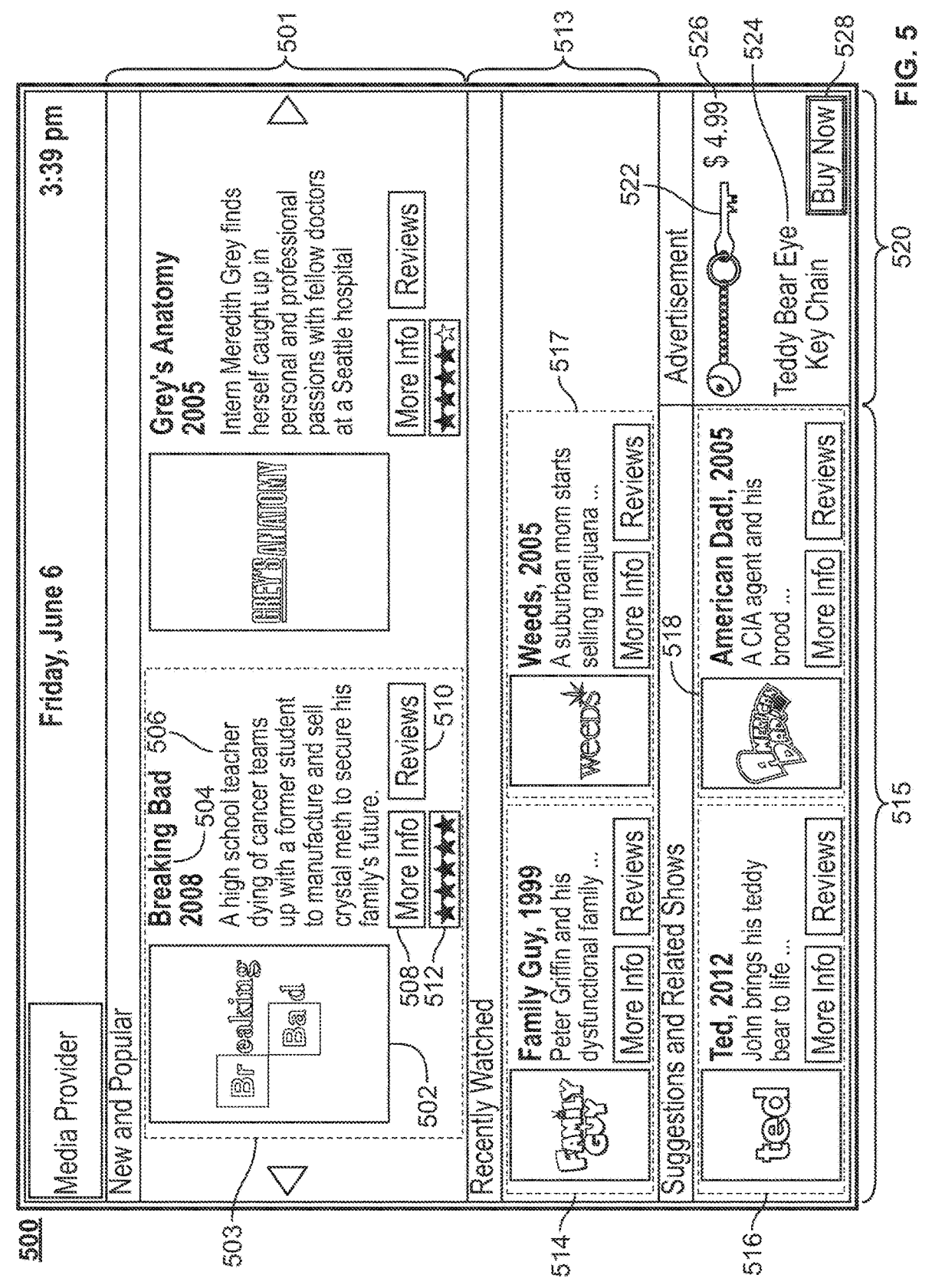

FIG. 5 shows an illustrative display screen 500 of an interactive media guidance application in accordance with another embodiment of the disclosure. Screen 500 includes new content region 501, previously accessed content region 513, related content region 515, and product promotion region 520. In some implementations, user interface elements of display screen 500 may correspond to media assets and may be generated according to fixed rules. The same type of data may be loaded for each user interface element of display screen 500. For example, all user interface elements may have the same layout and may provide a similar type of functionality, regardless of user's history of interacting with a particular user interface element or accessing a media asset that may be associated with the particular user interface element. For example, cover art, title and a brief description of a media asset may be loaded and generated for display for every single user interface element in a media guidance display screen 500. In some embodiments, loading of media guide data and generation of a user interface element for a given media asset may be performed based on user history of accessing the given media asset or another media asset that is related to the given media asset.

In some implementations, display screen 500 may be displayed when (or after) control circuitry 304 receives a user selection of television listings option 204 or another one of the selectable options 202 (FIG. 2). In some implementations, display screen 500 may be displayed when the user manually identifies a content source (e.g., selects a particular on demand media provider). Control circuitry 304 may access (e.g., tune to or navigate to) the content source identified by the user or corresponding to one of the selectable options 202 selected by the user.

New content region 501, previously accessed content region 513 and related content region 515 may include a user interface element corresponding to a particular media asset. The user interface element may provide information about the particular media asset as well as provide an interactive capability associated with the media asset. The particular media asset represented by a respective user interface element may be a linear or non-linear media asset. For example, in some implementations, the media asset may be a live broadcast of an event. In some embodiments, the user interface element may include one or more visual objects arranged in a particular order. Visual objects may be positioned next to each other or overlaid on top of each other. Any given visual object may provide a specific piece of information about the media asset or enable a particular interactive feature. A visual object may include cover art, title, text description, rating or review of the media asset, a button (e.g., to play, record or set a reminder for the media asset, to share the media asset with another user), a link (e.g., to a website or another media asset) or any other information that is related to the media asset or that is relevant to the user in view of user preferences.

For example, user interface element 503 may be associated with the TV series "Breaking Bad." User interface element 503 may include cover art 502 for the series or a particular episode of "Breaking Bad," a title 504 of the series or episode, a brief description 506 of the series or episode, a rating 512, as well as interactive features 508 and 510 that allow the user to access reviews and see more information about the series or episode.

Previously accessed content region 513 may include user interface elements corresponding to those media assets that the user has accessed in the past. In some implementations, user interface elements associated with previously accessed media assets may include the same types of visual objects and may have the same layout as other user interface elements, such as user interface element 503 discussed above.

Prior to generating the display screen 500 for display on user equipment device 300, control circuitry 304 may automatically retrieve a viewing history of the user from storage 308. For example, control circuitry 304 may retrieve a data structure associated with the viewing history from storage 308. Alternatively, control circuitry 304 may send a request to a remote source for information associated with the viewing history. The information associated with viewing history may include title information, series information, or episode information of a media asset previously accessed by the user, the time at which the user accessed the media last, the frequency at which the user accesses the media asset, the number of times the user has accessed the media asset, genre or category associated with the media asset, attributes of the media asset, or any other data that is associated with the media asset previously accessed by the user, or any combination of the same. Upon retrieval of the viewing history, control circuitry 304 may process the viewing history to determine which media assets have been viewed recently or during a particular time interval in the past. For example, control circuitry 304 may determine that an input requesting to access an episode of "Family Guy" has been received from the user two days ago. Control circuitry 304 may then generate an interface element 514 including cover art, title, a brief description and one or more interactive features associated with "Family Guy" and display user interface element 514 in previously accessed content region 513. Similarly, control circuitry 304 may determine that the user watched "Weeds" last week. Control circuitry 304 may then generate an interface element 517 including cover art, title, a brief description and one or more interactive features associated with "Weeds" and display user interface element 517 in previously accessed content region 513.

Control circuitry 304 may identify media assets that are related to media assets associated with any user interface element to be presented in the display screen 500, including user interface elements to be displayed in new content region 501 and recent content region 513. In some embodiments, control circuitry 304 may select an attribute (e.g., title, director, creator, producer, actor, year of release, genre, category, a keyword associated with a description of the media asset, or any other attribute) of a media asset associated with a user interface element to be presented in display screen 500 and cross-reference that attribute with a database of media attributes to obtain a candidate media asset that has a similar attribute and that is also going to be presented in display screen 500. The database of media attributes may be stored either locally, e.g., in storage 308 of user equipment device or at a local media server, or it may be stored at a remote location, e.g., at a media guidance application server or a streaming media server. In order to cross-reference the database, control circuitry 304 may send a query to the database requesting to identify a candidate media asset that has the same attribute as the given media asset. For example, the given media asset associated with user interface element 514 may be an episode of "Family Guy." Accordingly, control circuitry 304 may select an attribute associated with the show "Family Guy" (e.g., the name of the creator Seth MacFarlane) and send a request to a media attribute database to identify another show that has a similar attribute (e.g., another show created by Seth MacFarlane) and that is going to be presented in display screen 500. In some embodiments, the media attribute database may retrieve a data structure associated with the attribute included in the request. The media attribute database may then determine that another media asset (e.g., the movie "Ted") is included in the data structure and may designate this media asset as the candidate media asset. Information about the candidate media asset, such as its title, a media guidance identification number, or any other attribute associated with the media asset or identifying the media asset may be transmitted by the media attribute database back to control circuitry 304. Upon receipt of information about the candidate media asset, control circuitry 304 may generate a corresponding user interface element 516.

Similarly, control circuitry 304 may identify media assets that are related to any media asset previously accessed by the user. In some embodiments, control circuitry 304 may select an attribute (e.g., title, director, creator, producer, actor, year of release, genre, category, a keyword associated with a description of the media asset, or any other attribute) of a given media asset and cross-reference that attribute with a database of media attributes to obtain a candidate media asset that has a similar attribute. The database of media attributes may be stored either locally, e.g., in storage 308 of user equipment device or at a local media server, or it may be stored at a remote location, e.g., at a media guidance application server or a streaming media server. In order to cross-reference the database, control circuitry 304 may send a query to the database requesting to identify a candidate media asset that has the same attribute as the given media asset. For example, the given media asset may be "Ted." Accordingly, control circuitry 304 may select an attribute associated with "Ted" (e.g., the name of the creator Seth MacFarlane) and send a request to a media attribute database to identify another show having a similar attribute (e.g., another show created by Seth MacFarlane).

In some implementations, the media attribute database may retrieve a data structure associated with the attribute included in the request. The media attribute database may then determine that another media asset (e.g., "Family Guy") is included in the data structure and may designate this media asset as the candidate media asset. Information about the candidate media asset, such as its title, a media guidance identification number, or any other attribute associated with the media asset or identifying the media asset may be transmitted by the media attribute database back to control circuitry 304. Upon receipt of information about the candidate media asset, control circuitry 304 may determine whether or not the candidate media asset is a related media asset. For example, control circuitry 304 may compare an attribute of the candidate media asset to a user preference to determine if the attribute matches the user preference. In response to determining that the candidate media asset is a related media asset, control circuitry 304 may determine whether the user has accessed the related media asset in the past or in the recent past. For example, control circuitry 304 may retrieve viewing history of the user or viewing history for the related media asset itself and determine the user has accessed the related media asset two days ago.

In some embodiments, the media attribute database may determine that more than one media asset with a matching attribute are found in the database. Accordingly, the media attribute database may transmit a related content list including information about all media assets found to match the attribute received in the request to identify related media assets. For example, "Ted" and "American Dad!" may be identified as media assets related to "Family Guy." Accordingly, user interface elements 516 and 518 including cover art, title, a brief description and one or more interactive features for "Ted" and "American Dad!" may be displayed in related content region 515. In some implementations, the request sent by control circuitry 304 may include the selected attribute of the given media asset and any other information associated with the given media asset or with the user profile. For example, the request may include a second attribute of the given media asset to help the media attribute database to narrow down the search for related media assets.

In some implementations, control circuitry 304 may retrieve the user profile information and determine which of the candidate media assets included in the related content list matches criteria set by the user profile. For example, the user profile may indicate a user's strong preference for animated sitcoms and a weak preference for film comedies. Accordingly, control circuitry 304 may eliminate from the related content list each candidate media asset which is associated with a film comedy characteristic. For example, if the related content list includes "The Cleveland Show," "American Dad!" and "Ted," all created or directed by Seth MacFarlane, control circuitry 304 may eliminate "Ted" from the list because it is a film comedy. Similarly, the viewing history in the user profile may indicate that the user watches action movies more than any other category of movies. Accordingly, control circuitry 304 may eliminate from the related content list each related content which is associated with a characteristic that is not action. The profile may indicate that the user has a strong interest in another user's preference for content. In such circumstances, control circuitry 304 may retrieve the viewing history of another user and determine what type of content that user watches most. Control circuitry 304 may eliminate from the related content list any content that does not share characteristics with the type of content another user watches.

Control circuitry 304 may sort or organize the related content list according to the strength of the relationship between each candidate media asset in the list with the given media asset as well as the profile associated with the user. For example, the candidate media asset at the top of the list may have the strongest match between the criteria set by the profile and the selected attribute, whereas the candidate media asset at the bottom of the list may have the weakest match between the criteria set by the profile and the selected attribute.

In some implementations, product promotion region 520 may include a user interface element promoting a product. The product may be related to one of the media assets associated with any one of user interface elements in new content region 501, recent content region 513, or suggested content region 515. In some embodiments, the user interface element promoting the product may include the same types of visual objects and may have the same layout as other user interface elements promoting other products, regardless of user's history of purchasing related products or accessing related media assets.

In some embodiments, control circuitry 304 may determine that the product is related to a media asset and also matches user preferences stored in the user profile. For example, if user interface element 503 includes information about an episode of "Breaking Bad" and the user is interested in small accessories, control circuitry 304 may determine that a product such as the Teddy Bear Eye Key Chain might be of particular interest to the user. Accordingly, control circuitry 304 may cause a product promotion user interface element comprising one or more visual objects to be displayed in the product promotion region 520. For example, the product promotion user interface element may include an image of the product 522, a brief description of the product 524, its price 526, and an interactive feature 528 associated with the product. Control circuitry 304 may implement any suitable interactive feature associated with the product, such as viewing more information about the product, recommending the product to a friend or purchasing the product.

In some implementations, control circuitry 304 may determine that the product is not related to any media assets presented in the display screen 500 and that the product does not match any user preferences. However, the product may match a preference of a user's friend. If the user has previously indicated a strong liking of friend's preferences, then information about the product may be displayed in product promotion region 520. In some implementations, the product promotion may be associated with a product or content that requires purchase authorization. In such scenarios, control circuitry 304 may query the user for purchase information (e.g., credit card information or a username and password) before receiving authorization to access the selected product or content.

In some embodiments, instead of loading media guide data and generating user interface elements according to fixed rules, control circuitry 304 may employ flexible rules to load media guide data, generate user interface elements, or both. For example, user's preferences, user's viewing history, preferences of user's friends, viewing histories of user's friends, or any combination thereof, may be used in order to maximize available bandwidth for transmission of media assets and media asset descriptions as well as to efficiently generate a media guidance display screen that provides media guide data and functionality that are relevant to the user. These and other embodiments are discussed below in relation to FIGS. 6-7.

As used herein, the terms "media asset description" and "asset description" are used interchangeably and may refer to any information identifying, describing or otherwise characterizing a media asset. An asset description may include one or more descriptive elements. A descriptive element may include cover art, title, year, genre, episode number, series number, director, producer, creator, writer, member of the cast, album art, review, rating, price, summary, synopsis, critique, a portion of the media asset such as a preview or an image or a frame of the media asset, a portion of an audio included in the media asset, or any combination thereof, including a combination that does not include the title of the media asset. The asset description may be provided in any form or format. For example, the asset description may be provided as part of a text file, a markup language file (e.g., an HTML page or an XML file), as a data structure describing a descriptive element included in the asset description, or in any other suitable form or format. The asset description may include multiple files or data structures that identify descriptive elements of the asset description and may include parameters associated with display properties of descriptive elements (e.g., their size, color, relative or absolute position, brightness or opaqueness, etc.). For example, if the media asset is the first episode of the TV series "Breaking Bad," an asset description corresponding to the first episode may include cover art, title of the first episode "Pilot," names of main actors Bryan Cranston, Aaron Paul and Anna Gunn, and a brief text description of the TV series. The asset description corresponding to the first episode may be provided as two files: a JPEG image of the cover art, and an XML file including the title "Pilot," names Bryan Cranston, Aaron Paul, Anna Gunn, a brief text description of the TV series, and display properties associated with the JPEG image (e.g., its size in pixels and relative or absolute location on a media guidance display screen), and display properties associated with the title, names and brief text description (e.g., type of font, font color and size).

Figure 6:
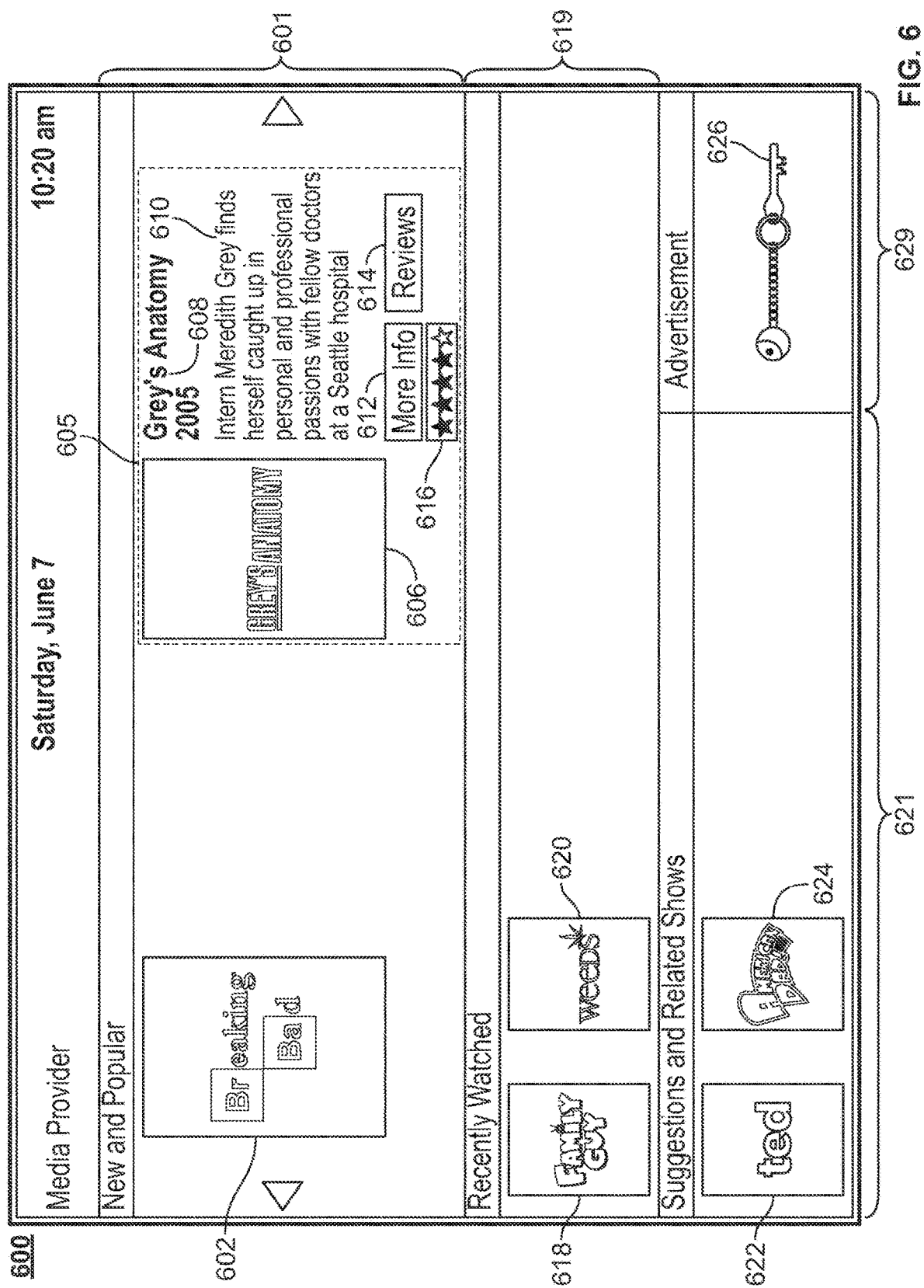
FIGS. 6 and 7 show illustrative display screens of providing an interactive media guidance application based on user history of accessing a media asset in accordance with embodiments of the disclosure.
Figure 7:
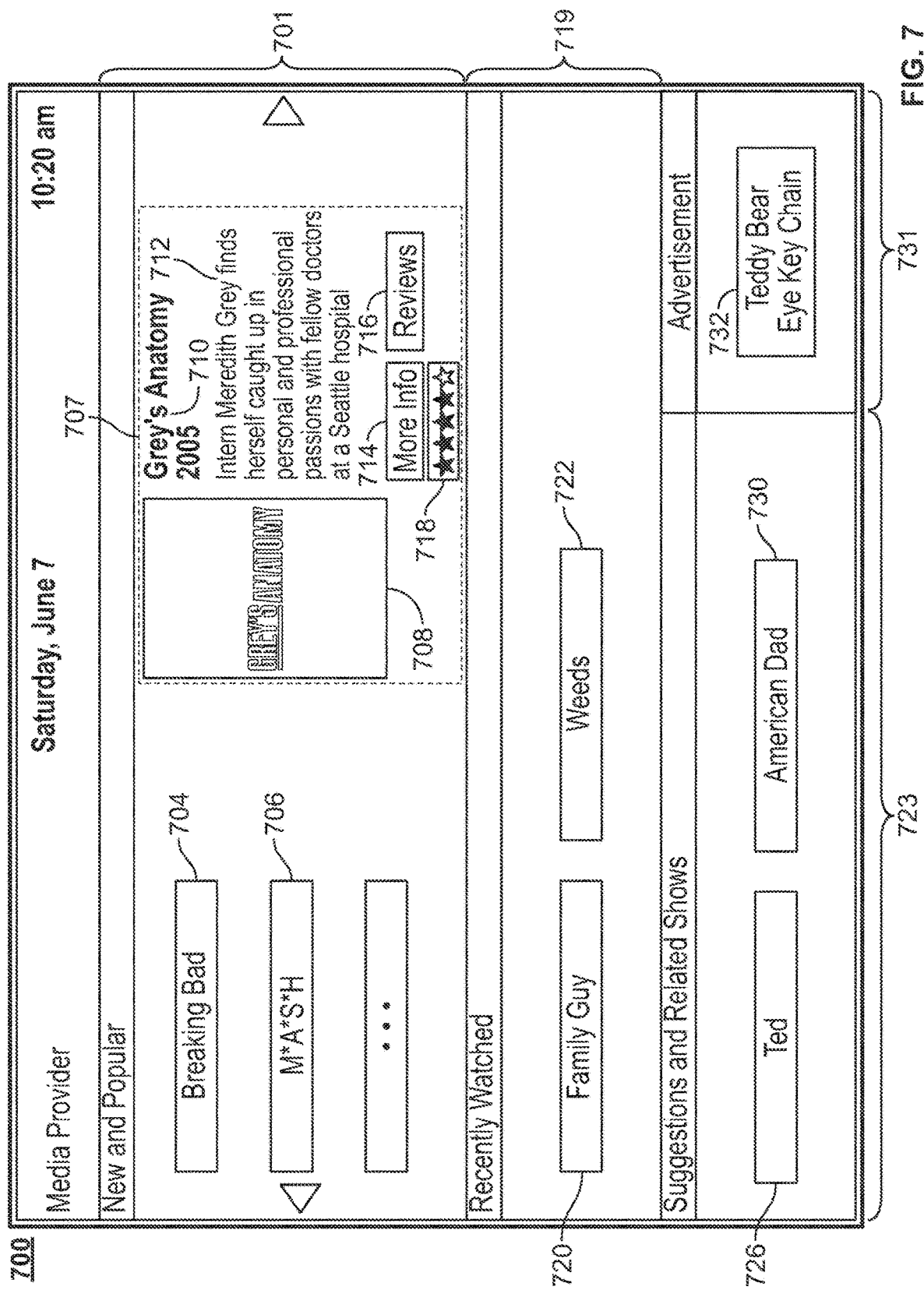

FIGS. 6 and 7 show illustrative display screens of providing an interactive media guidance application based on user history of accessing a media asset in accordance with embodiments of the disclosure. Prior to generating display screens 600 (or 700), control circuitry 304 may receive multiple asset descriptions associated with a given media asset. Each asset description may provide a different amount of information about the given media asset. For example, a first asset description may include only cover art of the given media asset; a second asset description may include both cover art and a brief text description; a third asset description may include title information only or a brief text description only, etc. Control circuitry 304 may parse each asset description to extract and generate visual objects for a user interface element associated with the given media asset. Either all asset descriptions or any proper subset of asset descriptions may be stored in storage 308 of user equipment 300 for retrieval at a later time, e.g., upon system startup or in response to receiving a user input such as an input selecting television listings 204 (FIG. 2).

In some implementations, control circuitry 304 may select and retrieve an asset description for a particular media asset from storage 308 based on the user's history of accessing that particular media asset or a related media asset in the past. For example, if the user has already viewed an episode of a particular TV show, the user may not be interested in seeing a full description of that TV show or even a description of a new episode that the user has not yet seen. Instead, the user may want to see a more concise description or a partial description, e.g., a description that includes only cover art, episode number, title, date, or any other piece of information about the media asset, or any combination thereof. Accordingly, control circuitry 304 may retrieve user's viewing history and generate a media guidance display screen 600 (or 700) based on the user's viewing history in order to make it compact, intuitive and easy to navigate for the user. For example, if control circuitry 304 determines that the user has already watched an episode of "Breaking Bad," it may generate user interface element 602 including only cover art (or user interface element 704 including only title) instead of user interface element 503 comprising cover art 502, title 504, brief description 506, rating 512, as well as interactive features 508 and 510, as discussed above in connection with FIG. 5.

In some embodiments, control circuitry 304 may determine the number of times that the user has accessed a particular media asset or a plurality of media assets (e.g., multiple episodes of a TV series) in order to select an asset description that best matches user's viewing history and habits. A different asset description (and a different user interface element) may be associated with a different number of times the user has accessed the particular media asset. This allows the media guidance application to adapt to user's behavior over time and generate progressively simpler and more intuitive media guidance display screens. For example, control circuitry 304 may store three asset descriptions for "Breaking Bad" in a data structure associated with "Breaking Bad" in storage 308. If the user has viewed only one episode of "Breaking Bad," control circuitry 304 may retrieve the data structure associated with "Breaking Bad" and select a first asset description consisting, for example, of cover art, a title, a brief description, and an interactive feature that allows the user to access additional information about the series. However, if the user has watched two episodes of "Breaking Bad," then control circuitry 304 may select a second asset description consisting, for example, of only cover art, a title and a brief description. Similarly, if the user has seen three episodes of "Breaking Bad," then control circuitry 304 may select a third asset description consisting, for example, of only cover art and title. Different asset description may be also selected based on the frequency with which the user accesses a media asset or based on how recently the user has accessed a media asset. For example, if the user has accessed an episode of "Breaking Bad" only yesterday, a user interface element for the next episode or a series may not include a text description or a link to a visual recap. However, if the user had a particularly busy month at work and did not have time to watch an episode of "Breaking Bad" that entire month, a text description or a visual recap may be included, e.g., in order to help the user remember what happened in the show leading up to the new episode.

In some implementations, instead of receiving multiple asset descriptions and selecting a different asset description based on user's viewing history, control circuitry 304 may receive a single description of the media asset comprising multiple pieces of information. Prior to generating a user interface element, control circuitry 304 may parse the single description and select particular pieces of information (e.g., cover art) or portions of these pieces of information to be included in the user interface element. For example, control circuitry 304 may parse a full text description to select particular portions of the full text description in order to create a brief summary.

In some implementations, a user interface element of a first media asset may be generated or modified based on user's history of accessing a second media asset that is related to the first media asset. A candidate media asset may be designated as a related media asset based on characteristics stored in the user profile, a relationship between the first media asset and the candidate media assets, or both. For example, if the user has previously indicated a strong interest in TV shows about drugs, control circuitry 304 may identify the TV show "Breaking Bad" as being related to the TV show "Weeds" previously accessed by the user. Although "Breaking Bad" may not have been previously accessed by the user, control circuitry 304 may select an asset description for it based on the number of times or the frequency with which the user has accessed "Weeds." Accordingly, user interface element 602 in new content region 601 (or element 704 in new content region 701) may not include a full description of "Breaking Bad." Similarly, if user interface element 618 (720) for a media asset (e.g., "Family Guy") was generated using an asset description selected based on the user accessing that media asset three times, other user interface elements, including user interface elements 622 and 624 in related content region 621 (or 726 and 730 in related content region 723) may be generated as if media assets associated with these user interface elements (e.g., "Ted" and "American Dad!") have also been accessed three times.

User interface elements of FIGS. 6 and 7 should be contrasted with user interface elements of FIG. 5. Whereas all user interface elements of FIG. 5 are generated according to the same rules (e.g., they all incorporate extensive descriptions including cover art, titles, and brief descriptions), user interface elements of FIGS. 6-7 are generated based on user's history of accessing related media assets. For example, because the user previously accessed an episode of "Weeds," user interface element 602 associated with "Breaking Bad" does not include an entire description and instead incorporates cover art only. At the same time, user element 605 does include an extensive description because the user has not watched any media assets related to "Grey's Anatomy." Similarly, user interface element 707 of FIG. 7 includes a full description of "Grey's Anatomy," while user element 704 incorporates only the tile of "Breaking Bad."

In some implementations, in order to generate or modify a first user interface element associated with the first media asset based on user's history of accessing a second media asset that is related to the first media asset, control circuitry 304 may retrieve a data structure that is associated with the first user interface element from storage 308. Control circuitry 304 may parse the data structure to identify the first media asset associated with the first user interface element. For example, control circuitry 304 may identify "Ted" as being associated with the first user interface element. In response to identifying the first media asset, control circuitry 304 may query the media attribute database to select an attribute of the first media asset. For example, control circuitry 304 may select the name of the creator of "Ted" Seth MacFarlane. After selecting the attribute of the first media asset, control circuitry 304 may retrieve information about a second media asset previously accessed by the user and related to the first media asset (e.g., "Family Guy") from storage 308. Information about the second media asset previously accessed by the user and related to the first media asset may include a title, an identification number corresponding to the second media asset or any data structure comprising an attribute identifying the second media asset. For example, control circuitry 304 may retrieve a data structure comprising the title "Family Guy." In some implementations, control circuitry 304 may send a request to a remote server to obtain information about the second media asset previously accessed by the user and related to the first media asset.

In response to obtaining information about the second media asset, control circuitry 304 may retrieve a data structure comprising multiple asset descriptions of the first media asset from storage 308. Control circuitry 304 may then select one of the descriptions in the data structure based on user's history of accessing the second media asset. For example, two asset descriptions for "Ted" may be stored in storage 308, with the first description comprising cover art and title and the second description comprising only cover art. In response to determining that the user has watched "Family Guy" more than 100 times, control circuitry 304 may retrieve both descriptions of "Ted" and select only one asset description, e.g., the second asset description.

In some embodiments, control circuitry 304 may generate a user interface element for the first media asset so that it includes a similar number or arrangement of visual objects as the second related media asset. For example, if only cover art (or only title) is included in user interface element 618 (or 720), user interface elements 622 and 624 (or 726 and 730) may also include only cover art (or only title). At the same time, user interface elements for shows that are not related to any media assets previously accessed by the user or shows that do not match characteristics of the user profile may include a more detailed description with more visual objects and may be displayed adjacent to user interface elements of shows found to be related to other media assets or of relevance to the user. For example, user interface element 605 (or 707) associated with an unrelated show (e.g., "Grey's Anatomy") may include multiple visual objects 606, 608, 610, 612, 614, 616 (or 708, 710, 712, 714, 716, 718) corresponding to cover art, title, brief description, rating and interactive features associated with the unrelated show. User interface element 605 (or 707) may be displayed next to user interface element 602 (or 704) of a show found to be related to previously accessed media assets or found to match characteristics of the user profile.

In certain implementations, visual objects for a user interface element may be selected based on whether a second user has recommended a media asset or a product to the user of the media guidance application. The second user may be another user of the media guidance application, e.g., another user using the same user equipment device 300, or another user located remotely. The second user may be related to the first user, e.g., the second user may be identified as a friend or a relative in the user profile of the media guidance application or a user profile of a third party provider (e.g., Facebook or Google+). In some implementations, control circuitry 304 may send a request to a remote server or authenticate the user with a third party provider using user's credentials to obtain a recommendation list of media assets or products recommended by other users. Upon receipt of the recommendation list, control circuitry 304 may store it in storage 308 and may parse it to obtain visual objects needed to generate user interface elements associated with recommended media assets and products, including, for example user interface elements 622 and 624 (or 726 and 730) of the related content region 621 (or 723), and user interface element 626 (or 732) of the product promotion region 629 (or 731).

In some implementations, control circuitry 304 may determine the number of times another user has commented, expressed a liking or posted a message about a particular media asset or product. Control circuitry 304 may compare that number to a threshold (that may be set automatically or by the user) and select an asset description based on whether the number exceeds that threshold. For example, if a user's friend is absolutely obsessed with the TV show "Breaking Bad" and commented more than ten times that he would like to purchase an official Teddy Bear Eye Key Chain on Facebook, the user of the media guidance application system might be already familiar with the details of the Teddy Bear Eye Key Chain (e.g., its price). Accordingly, it may make little sense to include a full description of this particular product in the product promotion region 629 (or 731) and control circuitry 304 may select a more concise description, including for example only an image of the key chain and an interactive feature allowing the user to purchase it.

In some implementations, control circuitry 304 may determine the number of user's friends who have commented, expressed a liking or posted a message about a particular media asset. It may then compare that number to a threshold (that may be set automatically or by the user) and select an asset description based on whether the number exceeds that threshold. For example, if more than 25 user's friends have indicated that they liked a particular media asset (e.g., the last episode of a M*A*S*H), the user might be familiar with the general subject matter of that media asset. Accordingly, control circuitry 304 may select a minimalist description of the media asset (e.g., a title) to be included in the media guidance application display screen 700, for example as a user interface element 706.

In some embodiments, display properties of user interface elements or visual objects included in user interface elements may be dynamically adjusted based on user's viewing history. Display properties of visual objects may include their size, font, font size, opaqueness or any other display property. In some implementations, the visual objects may be rearranged from a first order to a second order specifying their position relative to each other. For example, if a media asset associated with a user interface element has never been accessed by the user before, cover art may be shown in a first size. However, if the user has already accessed the media asset or if the media asset is related to another media asset previously accessed by the user, then cover art may be shown in a second size, which is smaller than the first size.

For example, control circuitry 304 may adjust display properties of a first user interface element associated with the first media asset based on user's history of accessing a second media asset that is related to the first media asset. Control circuitry 304 may retrieve a data structure that is associated with the first user interface element from storage 308. Control circuitry 304 may parse the data structure to identify the first media asset associated with the first user interface element. For example, control circuitry 304 may identify "Ted" as being associated with the first user interface element. In response to identifying the first media asset, control circuitry 304 may query the media attribute database to select an attribute of the first media asset. For example, control circuitry 304 may select the name of the creator of "Ted" Seth MacFarlane. After selecting the attribute of the first media asset, control circuitry 304 may retrieve information about a second media asset previously accessed by the user and related to the first media asset (e.g., "Family Guy") from storage 308. Information about the second media asset previously accessed by the user and related to the first media asset may include a title, an identification number corresponding to the second media asset or any data structure comprising an attribute identifying the second media asset. For example, control circuitry 304 may retrieve a data structure comprising the title "Family Guy." In some implementations, control circuitry 304 may send a request to a remote server to obtain information about the second media asset previously accessed by the user and related to the first media asset.

In response to obtaining information about the second media asset, control circuitry 304 may retrieve a data structure comprising display properties of the first user interface element from storage 308. Control circuitry 304 may then change one or more display properties of the first user interface element in the data structure based on user's history of accessing the second media asset. For example, in response to determining that the user has watched "Family Guy" more than 100 times, control circuitry 304 may update the data structure to change the size of the cover art for "Ted."

In some embodiments, control circuitry 304 may determine which user interface elements or program listings are either being displayed or are going to be displayed on a media guidance display screen. For example, control circuitry 304 may retrieve a data structure listing all elements presented or scheduled to be presented on the media guidance display screen from storage 308. For each user interface element listed in the data structure, control circuitry 304 may then identify a related media asset using any one of the embodiments described above in relation to finding a candidate media asset and designating it as related media asset. Once a related media asset is found, control circuitry 304 may select appropriate display properties for the corresponding user interface element being displayed or scheduled to be displayed based on the user history of accessing the related media asset. For example, two user interface elements corresponding to "Breaking Bad" and "American Dad" may be scheduled to be shown on a media guidance display screen. If it is determined that "Weeds" is related to "Breaking Bad" and the user has seen over 20 episodes of Weeds, then only cover art may be shown in the user interface element of "Breaking Bad." Similarly, if "Ted" is determined to be related to "American Dad!," but the user has never watches a sitcom before, then cover art and a brief description may be included in the user interface element of "American Dad!"

In some implementations, all user interface elements of a media guidance display screen may have the same display properties and may include the same number of visual objects when presented to the user (e.g., when presented to the user for the first time. If a user requests further information about a media asset associated with a given user interface element, then that user interface may be modified (e.g., to include fewer visual objects, a different description or by changing display properties of visual objects). In some embodiments, user interface elements of media assets related to the media asset for which the user requested addition information may be modified as well. For example, two user interface elements corresponding to two related shows "Family Guy" and "American Dad!" may be displayed with respective cover art and a full text description of the respective TV show. If a user requests more information about "Family Guy," then the user interface element for "American Dad!" may be modified to substitute its full text description with a shorter description (e.g. "another sitcom by Seth MacFarlane"). Alternatively, the user interface of "American Dad!" may be modified to include cover art only, thereby visually identifying "American Dad!" as a show that is related to "Family Guy."

Figure 8A:
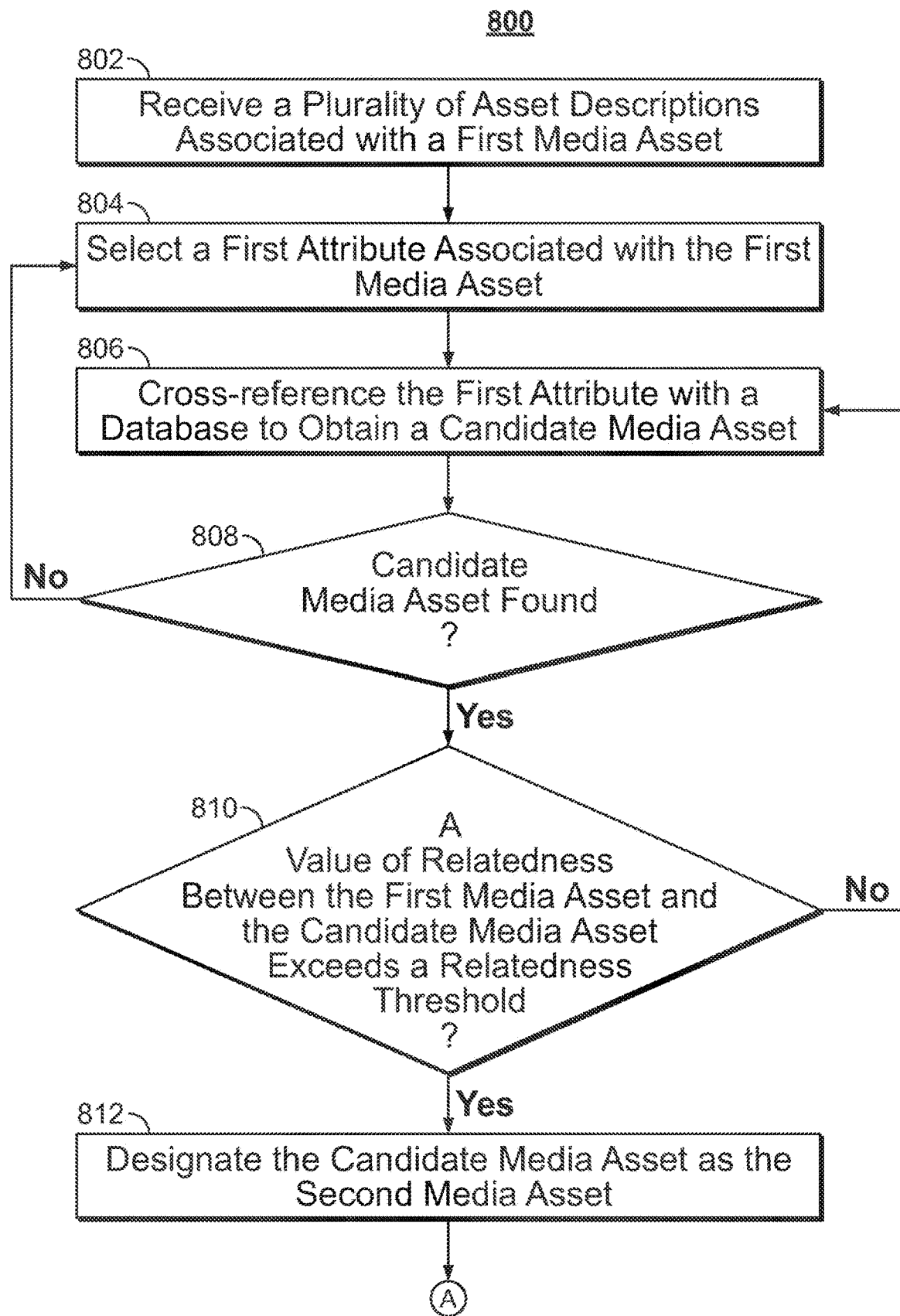
FIGS. 8A-B (hereinafter collectively referred to as FIG. 8) show a diagram of a process for loading interactive media guide data based on user history in accordance with embodiments of the disclosure.
Figure 8B:
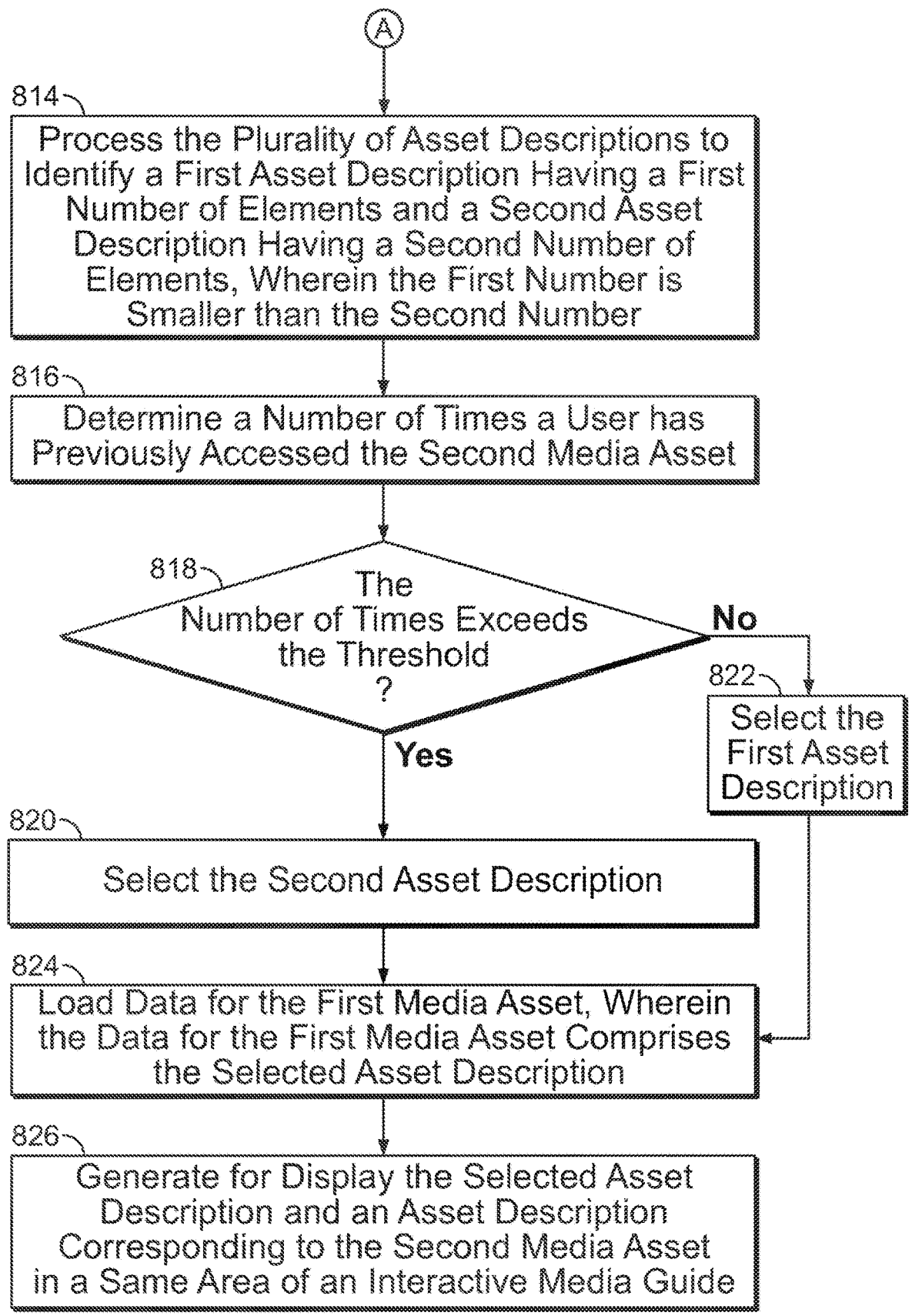

FIG. 8 is a diagram of a process 800 for loading interactive media guide data based on user history in accordance with embodiments of the disclosure. At step 802, a plurality of asset descriptions associated with a first media asset is received. For example, the first media asset may be "American Dad!" and a plurality of asset descriptions may include a description having cover art only and another description having both cover art and a brief text description of "American Dad!" In some embodiments, asset descriptions may be received from a remote server (such as media guidance data source 418 of FIG. 4).

At step 804, a first attribute associated with the first media asset is selected. The first attribute may be any attribute that defines or identifies the content of the first media asset. For example, the first attribute may be the name of the creator of "American Dad!" Seth MacFarlane.

At step 806, the first attribute is cross-referenced with a database to obtain a candidate media asset. For example control circuitry 304 may access a database from storage 308 and process a data structure associated with the first attribute to retrieve or extract information about a candidate media asset having a similar attribute. In some implementations, control circuitry 304 may search, using the first attribute, the Internet or a website, such as IMDB or Rotten Tomatoes to identify a candidate media asset.

At step 808, a determination is made as to whether the candidate asset has been found. When the candidate asset has been found in the database, the process proceeds to step 810, otherwise the process proceeds to step 804. For example, control circuitry 304 may process a data structure returned by the database and determine that the data structure contains a media asset different from the first media asset (e.g., the media asset different from the first media asset "American Dad!" may be "Family Guy" or "Ted," also created by Seth MacFarlane).

At step 810, a determination is made as to whether a value of relatedness between the first media asset and the candidate media asset exceeds a relatedness threshold (which may be set by a user). For example, control circuitry 304 may select a second attribute associated with the first media asset and compare it with a candidate attribute associated with the candidate media asset. When the value of relatedness between the first media asset and the candidate media asset exceeds the relatedness threshold, the process proceeds to step 812, otherwise the process proceeds to step 806. For example, if the second attribute associated with the first media asset is a genre "sitcom," then if the candidate media asset is "Ted," the process proceeds to step 806, since "Ted" is of different genre, namely "film comedy." In some embodiments, control circuitry 304 may compute a Euclidian distance or score (or other mathematical function) between attributes of a first media asset and the candidate media asset (e.g., distance between keywords describing the content of each media asset). When the computed distance or score exceeds a threshold value (which may be set by a user), control circuitry 304 may determine that the value of relatedness between the first media asset and the candidate media asset exceeds the relatedness threshold.

At step 812, the candidate media asset is designated as the second media asset.

At step 814, the plurality of asset descriptions is processed in order to identify a first asset description having a first number of elements and a second asset description having a second number of elements. In some embodiments, the first number of elements may be smaller than the second number of elements. For example, control circuitry 304 may identify a first asset description having only an image (e.g., cover art for "American Dad!") and a second asset description having an image and a brief text description of the media asset.

At step 816, a number of times a user has previously accessed the second media asset is determined. In some implementations, control circuitry 304 may retrieve user's viewing history from storage 308 and process it in order to determine the number of times.

At step 818, a determination is made as to whether the number of times exceeds the threshold. In some implementations, the threshold may be set by the user. When the number of times exceeds the threshold, the process proceeds to step 820, otherwise the process proceeds to step 822.

At step 820, the second asset description is selected. For example, the second asset description may include cover art and a brief text description for "American Dad!" In some implementations, control circuitry 304 may retrieve multiple asset descriptions associated with "American Dad!" from storage 308 (FIG. 3) and select the second description.

At step 822, the first asset description is selected. For example, the first asset description may include only cover art for "American Dad!" In some implementations, control circuitry 304 may retrieve multiple asset descriptions associated with "American Dad!" from storage 308 (FIG. 3) and select the first description.

At step 824, data for the first media asset is loaded. In some implementations, data for the first media asset includes the selected asset description.

At step 826, the selected asset description and an asset description corresponding to the second media asset are generated for display in a same area of an interactive media guide. For example, control circuitry 304 may generate the selected asset description and an asset description corresponding to the second media asset as part of user interface elements 514 and 518 (FIG. 5).

Figure 9A:
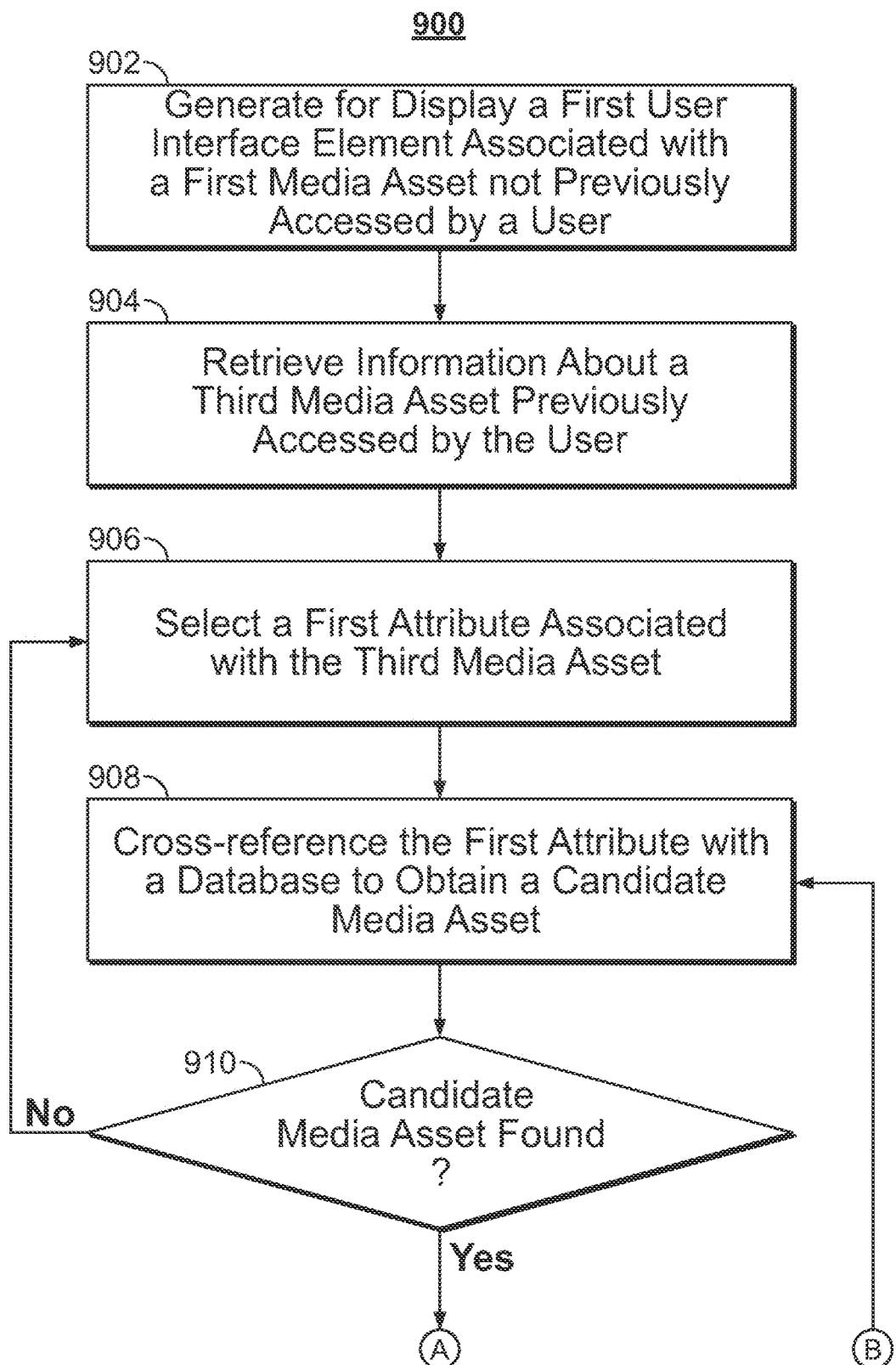
FIGS. 9A-C (hereinafter collectively referred to as FIG. 9) show a diagram of a process for generating for display an interactive media guide based on user behavior in accordance with embodiments of the disclosure.
Figure 9B:
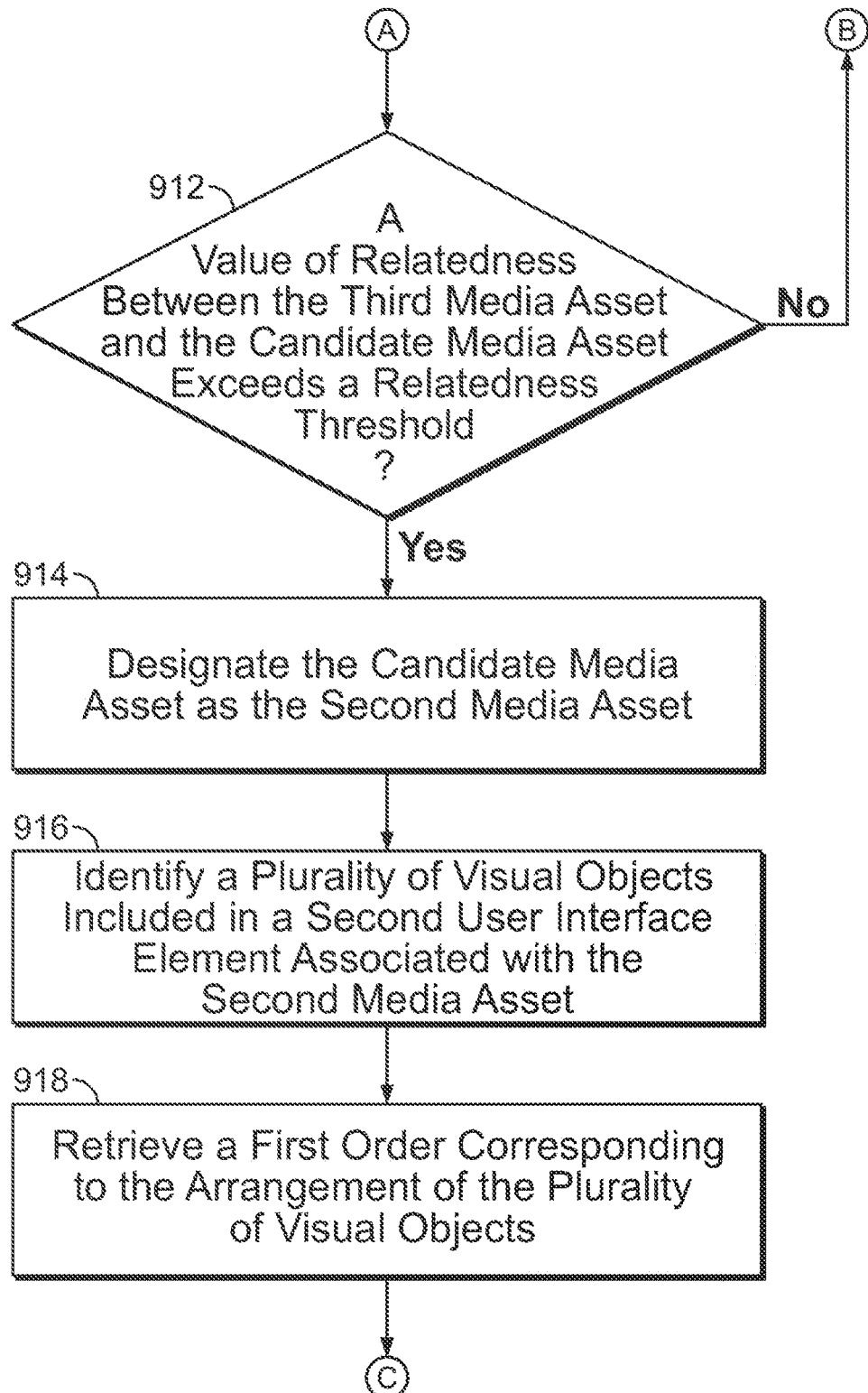
Figure 9C:
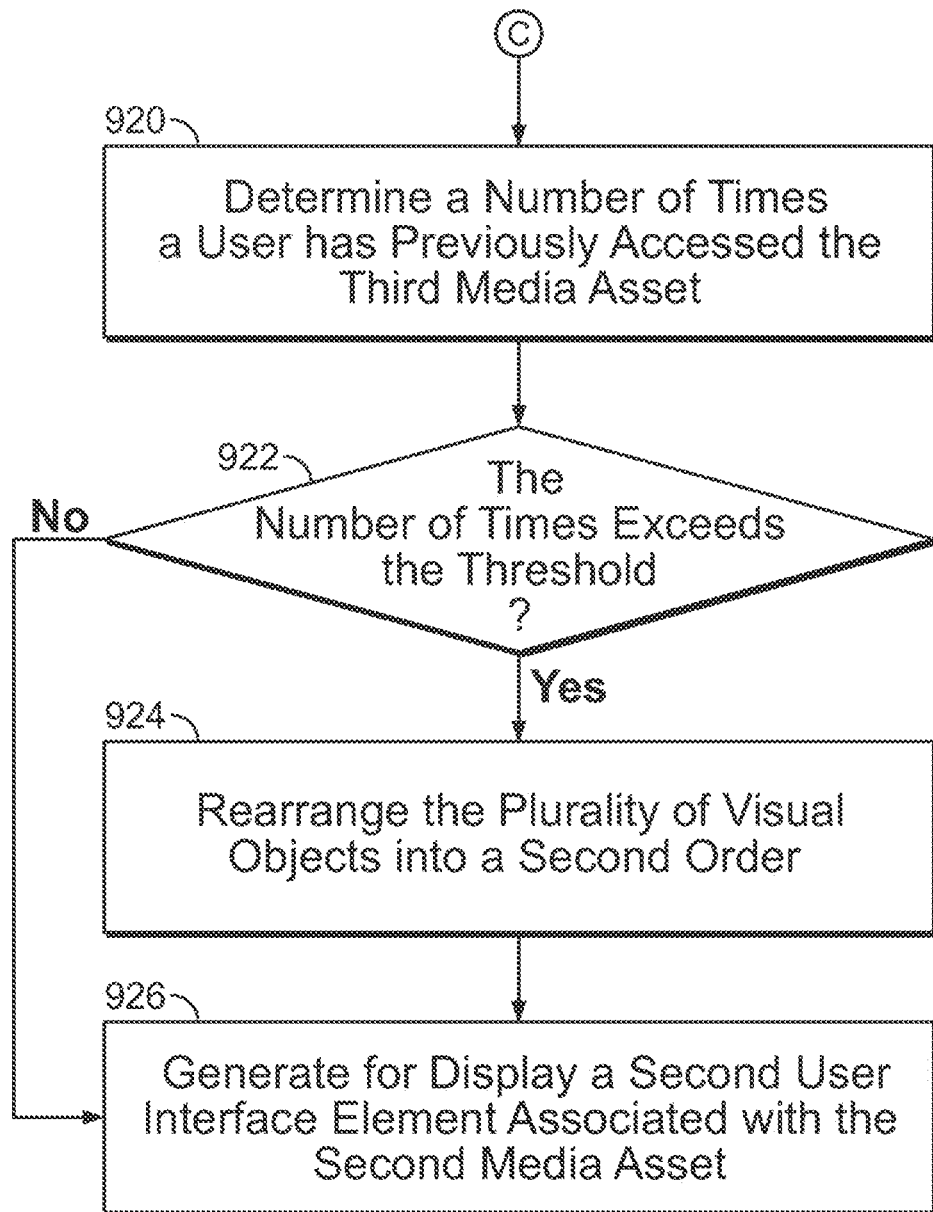

FIG. 9 is a diagram of a process 900 for generating for display an interactive media guide based on user behavior in accordance with embodiments of the disclosure. At step 902, a first user interface element associated with a first media asset not previously accessed by a user is generated for display. For example, the first media asset not previously accessed by the user may be an episode of the TV series "Grey's Anatomy" and the first user interface element may be user interface element 605 (FIG. 6).

At step 904, information about a third media asset previously accessed by the user is retrieved. For example, the third media asset may be "Family Guy". In some implementations, control circuitry 304 may retrieve the information about the third media asset from storage 308. In some embodiments, control circuitry 304 may query a remote server for information about the third media asset.

At step 906, a first attribute associated with the third media asset is selected. The first attribute may be any attribute that defines or identifies the content of the third media asset. For example, the first attribute may be the name of the creator of "Family Guy" Seth MacFarlane At step 908, the first attribute is cross-referenced with a database to obtain a candidate media asset. For example control circuitry 304 may access a database from storage 308 and process a data structure associated with the first attribute to retrieve or extract information about a candidate media asset having a similar attribute. In some implementations, control circuitry 304 may search, using the first attribute, the Internet or a website, such as IMDB or Rotten Tomatoes to identify a candidate media asset.

At step 910, a determination is made as to whether the candidate asset has been found. When the candidate asset has been found in the database, the process proceeds to step 912, otherwise the process proceeds to step 906. For example, control circuitry 304 may process a data structure returned by the database and determine that the data structure contains a media asset different from the third media asset (e.g., the media asset different from the third media asset "Family Guy" may be "American Dad!" or "Ted," also created by Seth MacFarlane).

At step 912, a determination is made as to whether a value of relatedness between the third media asset and the candidate media asset exceeds a relatedness threshold (which may be set by a user). For example, control circuitry 304 may select a second attribute associated with the third media asset and compare it with a candidate attribute associated with the candidate media asset. When the value of relatedness between the third media asset and the candidate media asset exceeds the relatedness threshold, the process proceeds to step 914, otherwise the process proceeds to step 908. For example, if the second attribute associated with the third media asset is a genre "sitcom," then if the candidate media asset is "Ted," the process proceeds to step 908, since "Ted" is of different genre, namely "film comedy." In some embodiments, control circuitry 304 may compute a Euclidian distance or score (or other mathematical function) between attributes of a third media asset and the candidate media asset (e.g., distance between keywords describing the content of each media asset). When the computed distance or score exceeds a threshold value (which may be set by a user), control circuitry 304 may determine that the value of relatedness between the third media asset and the candidate media asset exceeds the relatedness threshold.

At step 914, the candidate media asset is designated as the second media asset. For example, the candidate media asset designated as the second media asset may be "American Dad!."

At step 916, a plurality of visual objects included in a second user interface element that is associated with the second media asset is identified. For example, the plurality of visual objects may include cover art, title and a brief description of the second media asset (e.g., "American Dad!"). In some implementations, control circuitry 304 may retrieve a data structure from storage 308 specifying the plurality of visual objects included in the second user interface element.

At step 918, a first order corresponding to the arrangement of the plurality of visual objects may be retrieved. For example, the first order may indicate that cover art, title and a brief description for "American Dad!" are arranged from left to right, in that order.

At step 920, a number of times a user has previously accessed the third media asset is determined. In some implementations, control circuitry 304 may retrieve user's viewing history from storage 308 and process it in order to determine the number of times. For example, control circuitry 304 may determine that the user has accessed "Family Guy" ten times.

At step 922, a determination is made as to whether the number of times exceeds the threshold. In some implementations, the threshold may be set by the user. When the number of times exceeds the threshold, the process proceeds to step 924, otherwise the process proceeds to step 926.

At step 924, the plurality of visual objects (i.e., visual objects included in the second user interface element) is rearranged into a second order. In some implementations, the rearranging may include removing a visual object or changing its display property, such as size, font, font size, brightness or opaqueness.

At step 926, a second user interface element associated with the second media asset is generated for display. In some embodiments, a second display property of the second user interface element may be different from a corresponding first display property of the first user interface element. For example, the size of the first and second user interface elements may be different.

It should be understood, that the above steps of the flow diagrams of FIGS. 8 and 9 may be executed or performed in any order or sequence not limited to the order and sequence shown and described in the figures. Also, some of the above steps of the flow diagrams of FIGS. 8 and 9 may be executed or performed substantially simultaneously where appropriate or in parallel to reduce latency and processing times.

The above described embodiments of the present disclosure are presented for purposes of illustration and not of limitation, and the present disclosure is limited only by the claims which follow.

What is claimed is:

1. A method comprising:
   receiving an input from a user;
   in response to receiving the input and prior to output of a video content item:
      generating, from a plurality of metadata items that textually or visually describe the video content item, a compilation of metadata items for the video content item by:
         determining, based on a viewing history of the user, a number of times the user has previously accessed the video content item;
         determining, based on the number of times the user has previously accessed the video content item, a number of metadata items to be displayed; and
         generating the compilation of metadata items for the video content item that comprises the identified number of metadata items; and
      generating for display the generated compilation of metadata items simultaneously with an option to play the video content item.

2. The method of claim 1, further comprising arranging the identified number of metadata item in the compilation according to a first arrangement.

3. The method of claim 2, further comprising:
   comparing the number of times the user has previously accessed the video content item to a threshold;
   determining, based on the comparing, whether the number of times exceeds the threshold; and
   in response to determining that the number of times exceeds the threshold, rearranging the identified number of metadata items in the compilation.

4. The method of claim 3, wherein rearranging the identified number of metadata items includes changing a size of a visual object in the identified number of metadata items.

5. The method of claim 1, further comprising:
   determining whether the video content item is related to a second video content item; and
   in response to determining that the video content item is related to a second video content item, determining a second number of times the user has previously accessed the second video content item.

6. The method of claim 5, wherein the number of metadata items to be displayed is further based on the second number of times the user has previously accessed the second video content.

7. The method of claim 5, wherein the number of metadata items to be displayed is further determined by:
   comparing first metadata items associated with the video content item to second metadata items associated with the second video content item to determine a subset of the first metadata items associated that do not match the second metadata items; and
   selecting the subset of the first metadata items that do not match the second metadata items.

8. The method of claim 5, wherein determining whether the video content item is related to a second video content item further comprises:
   selecting a first attribute associated with the video content item;

cross-referencing the first attribute with a database to obtain a candidate video content item;
comparing a second attribute associated with the video content item to a candidate attribute associated with the candidate video content item to determine whether a value of relatedness between the video content item and the candidate video content item exceeds a relatedness threshold; and
in response to determining that the value of relatedness between the video content item and the candidate video content item exceeds the relatedness threshold, designating the candidate video content item as the second video content item.

9. The method of claim 1, wherein generating for display the generated compilation of metadata items simultaneously with an option to play the video content item further comprises:
generating a user interface element associated with the video content item; and
visually arranging the compilation of metadata items in the user interface element.

10. The method of claim 1, wherein:
the video content item comprises a plurality of episodes; and
determining, based on a viewing history of the user, a number of times the user has previously accessed the video content item comprises determining, based on the viewing history of the user, a total number of times the user has previously accessed each episode of the plurality of episodes.

11. A system comprising:
input circuitry configured to receive an input from a user; and
control circuitry configured to, in response to receiving the input and prior to output of a video content item:
generate, from a plurality of metadata items that textually or visually describe the video content item, a compilation of metadata items for the video content item by:
determining, based on a viewing history of the user, a number of times the user has previously accessed the video content item;
determining, based on the number of times the user has previously accessed the video content item, a number of metadata items to be displayed; and
generating the compilation of metadata items for the video content item that comprises the identified number of metadata items; and
generate for display the generated compilation of metadata items simultaneously with an option to play the video content item.

12. The system of claim 11, wherein the control circuitry is further configured to arrange the identified number of metadata item in the compilation according to a first arrangement.

13. The system of claim 12, wherein the control circuitry is further configured to:
compare the number of times the user has previously accessed the video content item to a threshold;
determine, based on the comparing, whether the number of times exceeds the threshold; and
in response to determining that the number of times exceeds the threshold, rearrange the identified number of metadata items in the compilation.

14. The system of claim 13, wherein rearranging the identified number of metadata items includes changing a size of a visual object in the identified number of metadata items.

15. The system of claim 11, wherein the control circuitry is further configured to:
determine whether the video content item is related to a second video content item; and
in response to determining that the video content item is related to a second video content item, determine a second number of times the user has previously accessed the second video content item.

16. The system of claim 15, wherein the control circuitry is further configured to base the number of metadata items to be displayed on the second number of times the user has previously accessed the second video content.

17. The system of claim 15, wherein the control circuitry is further configured to determine the number of metadata items to be displayed by:
comparing first metadata items associated with the video content item to second metadata items associated with the second video content item to determine a subset of the first metadata items associated that do not match the second metadata items; and
selecting the subset of the first metadata items that do not match the second metadata items.

18. The system of claim 15, wherein the control circuitry configured to determine whether the video content item is related to a second video content item is further configured to:
select a first attribute associated with the video content item;
cross-reference the first attribute with a database to obtain a candidate video content item;
compare a second attribute associated with the video content item to a candidate attribute associated with the candidate video content item to determine whether a value of relatedness between the video content item and the candidate video content item exceeds a relatedness threshold; and
in response to determining that the value of relatedness between the video content item and the candidate video content item exceeds the relatedness threshold, designate the candidate video content item as the second video content item.

19. The system of claim 11, wherein the control circuitry configured to generate for display the generated compilation of metadata items simultaneously with an option to play the video content item is further configured to:
generate a user interface element associated with the video content item; and
visually arrange the compilation of metadata items in the user interface element.

20. The system of claim 11, wherein:
the video content item comprises a plurality of episodes; and
the control circuitry configured to determine, based on a viewing history of the user, a number of times the user has previously accessed the video content item is further configured to determine, based on the viewing history of the user, a total number of times the user has previously accessed each episode of the plurality of episodes.

* * * * *